(12) United States Patent
Katada et al.

(10) Patent No.: US 6,671,475 B2
(45) Date of Patent: Dec. 30, 2003

(54) DRIVE POWER TRANSMISSION DEVICE, IMAGE FORMING APPARATUS AND PROCESS CARTRIDGE

(75) Inventors: Kazunori Katada, Tokyo (JP); Masami Maruko, Tokyo (JP); Naoto Tokutake, Tokyo (JP); Takehito Hiraga, Tokyo (JP); Satoshi Hamaya, Tokyo (JP); Susumu Tashiro, Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/760,323

(22) Filed: Jan. 12, 2001

(65) Prior Publication Data

US 2001/0008590 A1 Jul. 19, 2001

(30) Foreign Application Priority Data

Jan. 17, 2000 (JP) .......................................... 2000-007671

(51) Int. Cl.⁷ .......................... G03G 21/16; G03G 15/02
(52) U.S. Cl. ........................ 399/111; 399/167; 464/154
(58) Field of Search .................................. 399/167, 116, 399/117, 111, 265, 279, 36; 464/41, 149, 153, 154, 88; 403/359.1, 359.3, 359.6

(56) References Cited

U.S. PATENT DOCUMENTS

| | | | | |
|---|---|---|---|---|
| 1,983,007 A | * | 12/1934 | Simons | 464/88 |
| 2,859,599 A | * | 11/1958 | Case | 464/88 |
| 2,952,143 A | * | 9/1960 | Case | 464/88 |
| 3,174,302 A | * | 3/1965 | Pomper | 464/154 |
| 3,588,154 A | * | 6/1971 | Voight | 403/300 |
| 3,871,786 A | * | 3/1975 | Rennerfelt | 192/114 T |
| 4,312,193 A | * | 1/1982 | Gibbs et al. | 464/149 |
| 4,662,859 A | * | 5/1987 | Sakai et al. | 464/154 |
| 5,070,366 A | * | 12/1991 | Tsuchiya | 399/162 |
| 5,128,715 A | * | 7/1992 | Furuyama et al. | 399/116 |
| 5,139,460 A | * | 8/1992 | Hoyt et al. | 464/154 |
| 5,993,101 A | * | 11/1999 | Kohno et al. | 399/116 |
| 6,035,159 A | * | 3/2000 | Azuma et al. | 399/111 |
| 6,035,758 A | * | 3/2000 | Taylor et al. | 83/665 |
| 6,240,266 B1 | * | 5/2001 | Watanabe et al. | 399/117 |

FOREIGN PATENT DOCUMENTS

| | | | |
|---|---|---|---|
| JP | 04-015315 | 1/1992 | |
| JP | 05-25453 | 4/1993 | |
| JP | 08-006368 | 1/1996 | |
| JP | 08-006456 | 1/1996 | |
| JP | 08-006457 | 1/1996 | |
| JP | 08146825 A | * 6/1996 | .......... G03G/21/00 |
| JP | 08-220938 | 8/1996 | |
| JP | 09-066637 | 3/1997 | |
| JP | 10252767 A | * 9/1998 | .......... F16D/1/10 |

* cited by examiner

*Primary Examiner*—Robert Beatty
(74) *Attorney, Agent, or Firm*—Frishauf, Holtz, Goodman & Chick, P.C.

(57) ABSTRACT

A transmission mechanism for transmitting rotation of a driving source in a main body to an object mounted on the main body for receiving the rotation, the transmission mechanism comprising a plurality of couplings provided at different positions along an axial direction of a rotating axis; wherein each of the couplings comprises, a male coupling member having a plurality of protrusions provided at an identical internal on an outer circumferential surface of the rotating axis; and a female coupling member having a plurality of protrusions for engaging with the male coupling's protrusions.

35 Claims, 12 Drawing Sheets

DRIVE POWER TRANSMISSION DEVICE, IMAGE FORMING APPARATUS AND PROCESS CARTRIDGE

BACKGROUND OF THE INVENTION

The present invention relates to a drive power transmission device and an image forming apparatus equipped with the drive power transmission device, and in particular, to a drive power transmission device which transmits a rotation drive force coming from a driving source to a detachable driven member, an image forming apparatus equipped with the drive power transmission device and to a process cartridge.

For example, in many image forming apparatuses forming images through an electrophotographic system, a photoreceptor and a developing device are detachably provided on the image forming apparatus main body. As a detachable component to be provided detachably, there are given one wherein a photoreceptor and an individual developing device are unitized integrally, one wherein a photoreceptor and a developing device are united as a unit and common one wherein components around a photoreceptor such as a charging device and a cleaning device in addition to the aforesaid photoreceptor and developing device are formed as a unit to be the detachable component that is called a process cartridge.

The detachable component of this kind includes those which rotate in the course of image forming such as a photoreceptor and a developing sleeve, and these rotary components are connected to a driving source on the image forming apparatus main body then they are mounted.

Incidentally, a drive system that drives rotary components such as a photoreceptor and a developing sleeve is required to be one wherein an occurrence of rotational irregularity and a vibration is strictly repressed. The reason for this is that image quality is easily affected by rotational irregularity and a vibration to the utmost extent. On the other hand, when driving components that can be mounted and dismounted, rotational irregularity and a vibration are easily caused. To satisfy these antinomic requirements, there have been made various inventions.

In TOKKAIHEI 4-15315, there is suggested to use a universal joint wherein rotatable link mechanisms in a plurality of steps are combined.

In JiKKAIHEI 5-25453, TOKKAIHEI 8-6368, TOKKAIHEI 8-6456 and TOKKAIHEI 8-6457, there is described to use a universal joint of a pin-coupling type.

In TOKKAIHEI 8-220938, there is described that a spline-coupling in one step is used. Further, in TOKKAIHEI 9-66637, there is described that a coupling portion is provided on each of an inner circumferential surface and an outer circumferential surface of an elastic member.

In the conventional examples stated above, there is a problem that rotational irregularity and vibration both generated while detachable components are driven to rotate cannot be prevented sufficiently.

It is considered that the causes for occurrence of the rotational irregularity and vibration both generated while detachable components are driven to rotate lie in the following points.

In the drive system wherein connection is cut by dismounting, it is unavoidable to a certain extent that an axis of a driving side is deviated from that of a driven side. Because of this deviation, a deviating force in addition to rotational force is applied to a driven shaft in the course of rotation, and thereby, the rotational irregularity and vibration are caused. Each of a pin type universal joint and a one-step spline coupling is one wherein a driving shaft and a driven shaft are connected with a coupling having a buffer effect to repress an occurrence of rotational irregularity and vibration even when the driving shaft is deviated from the driven shaft, but it has been confirmed that an effect of the repression is not sufficient.

In the conventional technology stated above, therefore, a tolerance for the deviation between the driving shaft and the driven shaft is small, which causes a problem in manufacturing and a cost increase.

Further, since a tolerance for the deviation between the driving shaft and the driven shaft is small, workability for mounting and dismounting is lowered. Further, in the case of a mechanism requiring fixing with a screw for mounting, workability for mounting and dismounting is further lowered. An object of the invention is to solve the problem stated above in the driving system wherein a driven shaft can easily be mounted on a driving shaft.

SUMMARY OF THE INVENTION

In accordance with a first aspect of the present invention, an apparatus for forming an image on a recording medium, which has a process cartridge detachably mounted thereto (the process cartridge including at least one element-device, such as a photoreceptor device, an exposure device, a developing device, a charging device and a cleaning device) includes a driving source to generate a rotational-driving force which is transmitted to at least the process cartridge when the process cartridge is mounted on the image apparatus, and a spline joint section to transmit the rotational-driving force from the driving source to the process cartridge when the process cartridge is mounted on the apparatus. The spline joint section includes a first male-spline member which is fitted on a driving axis of the driving source, and an outer surface of which is splined into a plurality of first protrusions. The spline joint section also includes a second male-spline member, which is fitted on a driven axis of the process cartridge, and an outer surface of which is splined into a plurality of second protrusions, and an intermediate female-spline member, a driving side inner surface of which is splined into a plurality of third protrusions while a driven-side inner surface of which is splined into a plurality of fourth protrusions so that the first protrusions of the first male-spline member are engaged with the third protrusions while the second protrusions of the second male-spline member are engaged with the fourth protrusions.

In accordance with another aspect of the present invention, an apparatus for forming an image on a recording medium, which has a process cartridge detachably mounted thereto (the process cartridge including at least one element-device, such as a photoreceptor device, an exposure device, a developing device, a charging device and a cleaning device) includes a driving source to generate a rotational-driving force which is transmitted to at least the process cartridge when the process cartridge is mounted on the apparatus, and a spline joint section to transmit the rotational-driving force from the driving source to the process cartridge when the process cartridge is mounted on the apparatus. The spline joint section includes a first male-spline member, which is fitted on a driving axis of the driving source, and an outer surface of which is splined into a plurality of first protrusions, a second female-spline member which is fitted on a driven axis of the process cartridge, and an inner surface of which is splined into a plurality of second protrusions, and an intermediate spline member, an inner surface of which is splined into a plurality of third protrusions while an outer surface of which is splined into a plurality of fourth protrusions, so that the first protrusions of the first male-spline member are engaged with the third protrusions while the second protrusions of the second female-spline member are engaged with the fourth protrusions.

In accordance with another aspect of the present invention, a spline joint mechanism for transmitting a rotational-driving force generated by a driving source provided in a main apparatus to an objective unit detachably mounted to the main apparatus includes a first male-spline member, which is fitted on a driving axis of the driving source, and an outer surface of which is splined into a plurality of first protrusions, and a second male-spline member which is fitted on a driven axis of the objective unit, and an outer surface of which is splined into a plurality of second protrusions. The spline joint member also includes an intermediate female-spline member, a driving-side inner surface of which is splined into a plurality of third protrusions while a driven-side inner surface of which is splined into a plurality of fourth protrusions, so that the first protrusions of the first male-spline member are engaged with the third protrusions while the second-protrusions of the second male-spline member are engaged with the fourth protrusions. The first male-spline member and the second male-spline member are detachably and loosely engaged with the intermediate female-spline member with movement between them, so as to constitute a universal joint, which can transmit the rotational-driving force from the driving source to the objective unit even if the driving axis does not coincide with the driven axis within a certain range. Each of the first and third protrusions has an affecting surface whose direction coincides with a radial direction of each of the first male-spline member and intermediate female-spline member. When transmitting the rotational-driving force from the first male-spline member to said intermediate female-spline member, affecting surfaces of the first protrusions press-contact affecting surfaces of the third protrusions, so that a component force of the rotational driving force is not generated in a direction other than that orthogonal to the affecting surface.

In accordance with another aspect of the present invention, a spline joint mechanism for transmitting a rotational-driving force, generated by a driving source provided in a main apparatus, to an objective unit detachably mounted to the main apparatus, includes a first male-spline member, which is fitted on a driving axis of the driving source, and an outer surface of which is splined into a plurality of first protrusions, a second female-spline member which is fitted on a driven axis of the objective unit, and an outer surface of which is splined into a plurality of second protrusions. The spline joint mechanism also includes an intermediate spline member, an inner surface of which is splined into a plurality of third protrusions while an outer surface of which is splined into a plurality of fourth protrusions, so that the first protrusions of the first male-spline member are engaged with the third protrusions while the second protrusions of the second female-spline member are engaged with the fourth protrusions. The first male-spline member and the second female-spline member are detachably and loosely engaged with the intermediate spline member with movement therebetween so as to constitute a universal joint which can transmit the rotational-driving force from the driving source to the objective unit even if the driving axis does not coincide with the driven axis within a certain range. Each of the first and third protrusions has an affecting surface whose direction coincides with a radial direction of each of the first male-spline member and intermediate spline member, and when transmitting the rotational-driving force from the first male-spline member to the intermediate spline member, affecting surfaces of the first protrusions press-contact affecting surfaces of the third protrusions, so that a component force of the rotational-driving force is not generated in a direction other than that orthogonal to the affecting surface.

BRIEF DESCRIPTION OF THE DRAWINGS

Other objects and advantages of the present invention will become apparent upon reading the following detailed description and upon reference to the drawings in which:

DETAILED DESCRIPTION OF THE PREFERRED EMBODIMENT (1) Drive Power Transmission Device A drive power transmission device relating to an embodiment of the invention will be explained as follows, referring to FIG. 1 and FIG. 2. FIG. 1 is a sectional view of a drive power transmission device related to an embodiment of the invention, and FIG. 2 is an exploded perspective view of the drive power transmission device.

Figure 1:
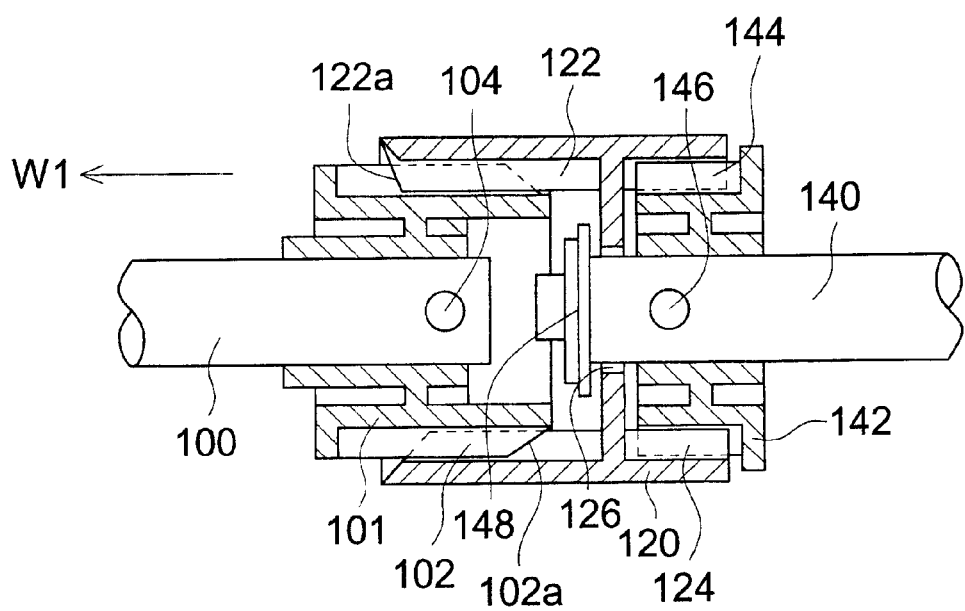
FIG. 1 is a sectional view of a drive power transmission device related to an embodiment of the invention.
Figure 2:
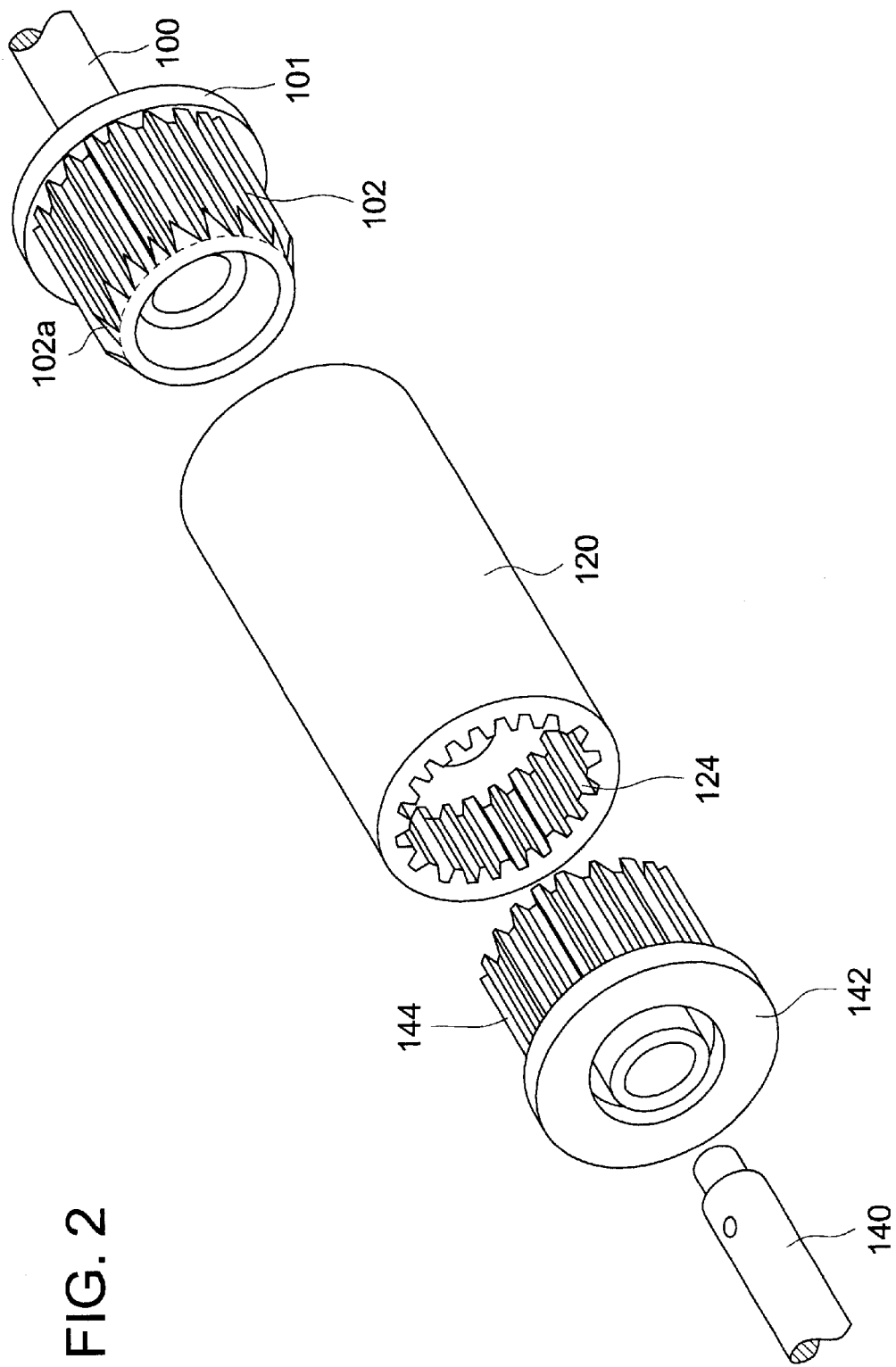
FIG. 2 is an exploded perspective view of a drive power transmission device related to an embodiment of the invention.

In the drawing, the numeral 100 represents a driven shaft constituting a rotated member to which a rotation from a driving source is transmitted. The numeral 101 is a driven side transmission member representing a driven side member that transmits a rotation to the driven shaft 100. The driven side transmission member 101 has male coupling section 102 formed with splines, and is fixed on the driven shaft 100 by pin 104. Male coupling section 102 is an example of a driven side coupling.

An intermediate transmission member representing an intermediate member is represented by 120, and it has female coupling sections 122 and 124 formed with splines. Female coupling section 122 is an example of the second intermediate coupling, while, female coupling section 124 is an example of the first intermediate coupling section.

The numeral 140 represents a driving shaft constituting a driving source. The numeral 142 represents a driving side transmission member representing a driving side member to which a rotation is transmitted from the driving shaft 140, and it has male coupling section 144 formed with splines, and is fixed on the driving shaft 140 by pin 146. The driving shaft 140 constitutes the driving side.

As a material constituting driven side transmission member 101, intermediate transmission member 120 and driving side transmission member 142, there are used resins such as polyacetal and nylon and metal.

Male coupling section 144 is an example of a driving side coupling section.

Each of the male coupling sections 102 and 144 has convex portions provided at regular intervals, namely, at regular angular intervals on a circumferential surface whose center is a rotational axis of the male coupling section, and it is preferable that the number of the convex portions is 4 or more. Further, female coupling section 122 has concave portions engaging with the convex portions of the male coupling section 102, namely, the concave portions are arranged at regular intervals, namely at regular angular intervals on a circumferential surface whose center is a rotational axis of the concave portion, and it is preferable that the number of the concave portions is 4 or more. In addition, female coupling section 124 has concave portions engaging with the convex portions of the male coupling section 144, and the concave portions are arranged, in the same way as in the male coupling section 144, at regular intervals, namely at regular angular intervals on a circumferential surface whose center is a rotational axis of the female coupling section, and it is preferable that the number of the concave portions is 4 or more. When the number of each of the convex portions and the concave portions for male coupling sections 102 and 144 and for female coupling sections 122 and 124 is made to be 4 or more, occurrence of vibration caused by driving force can be repressed.

Driven shaft 100 can be coupled with and uncoupled from driving shaft 140, and when male coupling section 102 is engaged with female coupling section 122 and when female coupling section 124 is engaged with male coupling section 144, a rotation of driving shaft 140 is transmitted to driven shaft 100. The male coupling section and the female coupling section are engaged with each other with a play, namely, both of them are loose-fitted each other. When the driven shaft 100 is moved in the direction toward W1, driven side transmission member 101 leaves intermediate transmission member 120, and thus, the aforesaid engagement is canceled. Incidentally, the intermediate transmission member 120 is loosely fitted to driving shaft 140 through hole 126 having a diameter slightly larger than a diameter of the driving shaft 140, and is held to be capable of being displaced (capable of swinging) by stopper ring 148 that is provided on the driving shaft 140, which prevents that the intermediate transmission member 120 comes off the driving shaft 140.

Further, it is also possible to hold the intermediate transmission member to be capable of being displaced with a driving side transmission member, a driven side transmission member, or further, a main body or an intermediate transmission member, without providing a holding member that holds an intermediate transmission member to be capable of being displaced directly on driven shaft 100 or driving shaft 140. In short, the intermediate transmission member has only to be prevented from coming off when an engagement is canceled.

Various preferable modes in the present embodiment will be explained as follows, referring to FIG. 3–FIG. 6, and these various preferable modes are applied to driven side transmission member 101, intermediate transmission member 120 and driving side transmission member 142 shown in FIG. 1.

In the present embodiment, a plurality of couplings each being formed by engagement between a male coupling section and a female coupling section are provided, and these couplings are shifted in the direction of rotational axis to make a tolerance for deviation between the driving shaft and the driven shaft to be great, and thereby, an effective buffer function is given to the drive power transmission device to repress vibration on the driven side.

Figure 3:
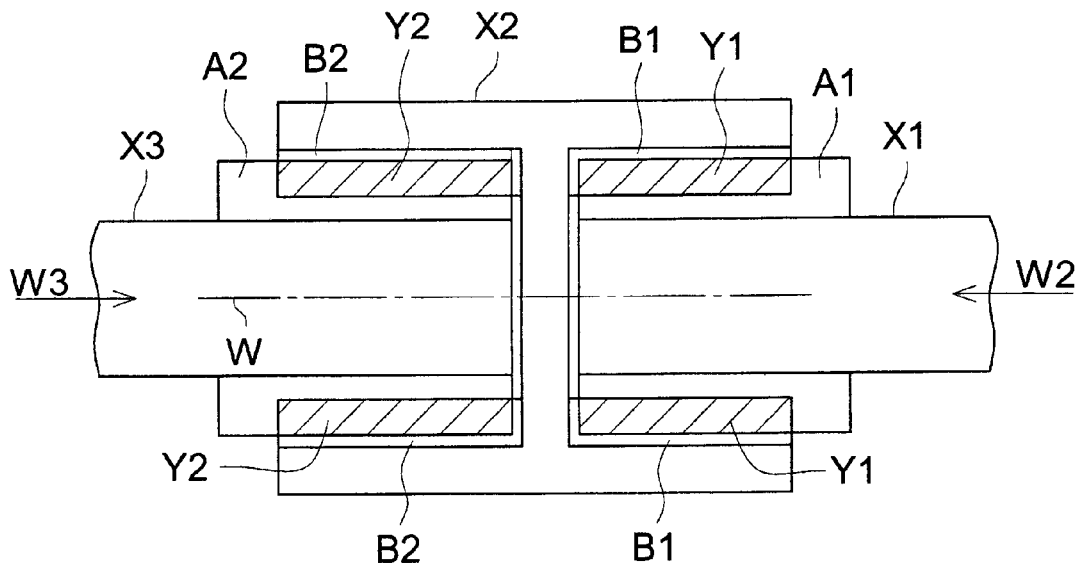
FIG. 3 is a diagram showing illustratively a drive power transmission device related to an embodiment of the invention.

FIG. 3 is a diagram illustrating an arrangement wherein a plurality of couplings are arranged to be shifted in the rotational axis direction, and it is a diagram showing illustratively the drive power transmission device shown in FIG. 1.

In FIG. 3, coupling section A1 (corresponding to male coupling section 144) of driving side transmission member X1 (corresponding to driving side transmission member 142) provided on a driving shaft engages with coupling section B1 (corresponding to female coupling section 124) of intermediate transmission member X2 (corresponding to intermediate transmission member 120) to form first coupling Y1, and coupling section A2 (corresponding to male coupling section 102) of driven side transmission member X3 (corresponding to driven side transmission member 101) provided on a driven shaft engages with coupling section B2 (corresponding to female coupling section 122) of intermediate transmission member X2 at second coupling Y2, and the first coupling Y1 and the second coupling Y2 are provided to be shifted each other in the rotational axis direction.

In the present embodiment, the male coupling section and the female coupling section are engaged with each other under the loose fitting condition, namely, both of them are engaged with each other, with a play existing between them. Due to this, it is possible to make the intermediate transmission member to have an effective buffer function, and vibration on the driven side is prevented.

In this case, "a play" is a half of the distance for which the intermediate transmission member can be displaced against the driving side transmission member or against the driven side transmission member in the direction perpendicular to the rotational axis of each of them. In the example shown in FIG. 4, the explanation about the play is as follows.

Figure 4:
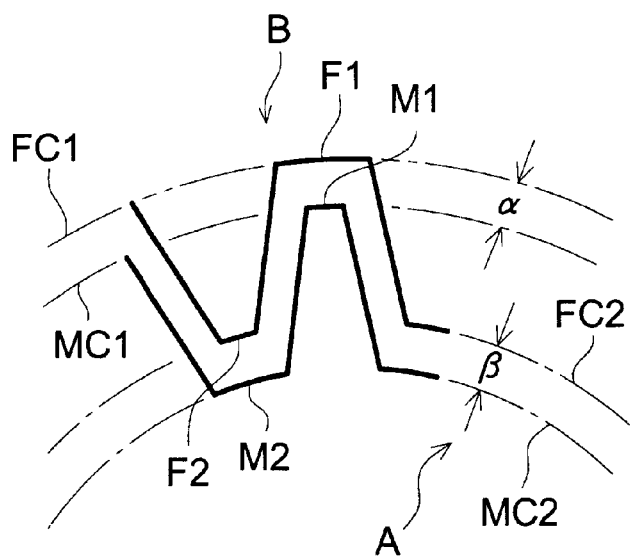
FIG. 4 is a diagram illustrating how a convex portion of a male coupling section is engaged with a concave portion of a female coupling section under a loose fitting condition.
Figure 5:
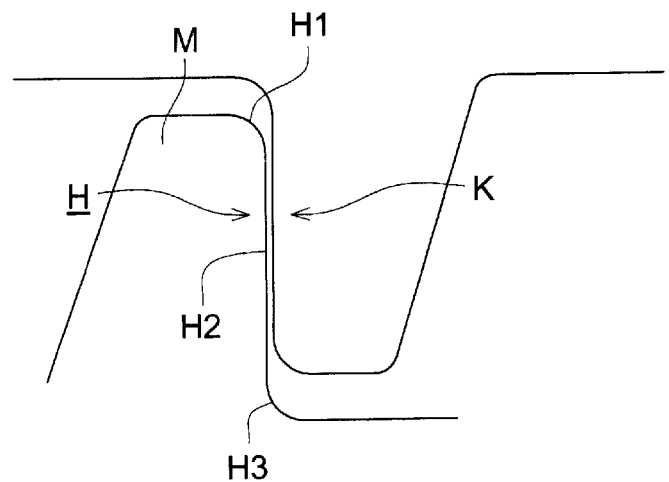
FIG. 5(*a*) and FIG. 5(*b*) are enlarged views of a coupling section formed with splines.
Figure 5:
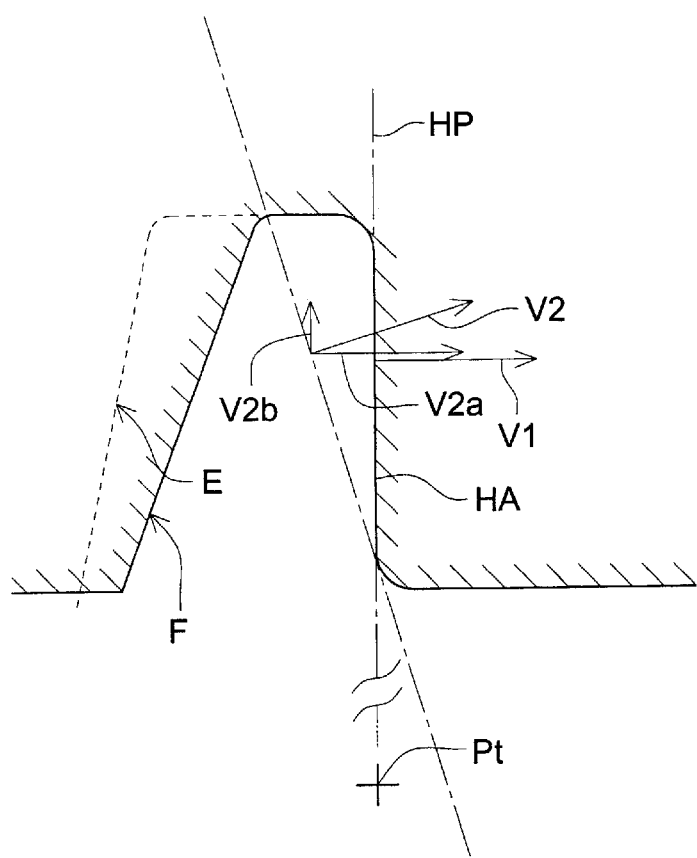
Figure 6:
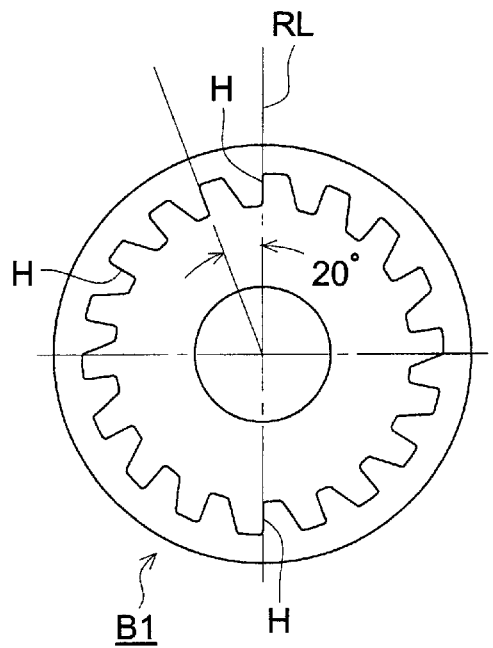
FIG. 6(*a*) and FIG. 6(*b*) are diagrams showing relationship between a coupling section constituting a first coupling and a coupling section constituting a second coupling.
Figure 6:
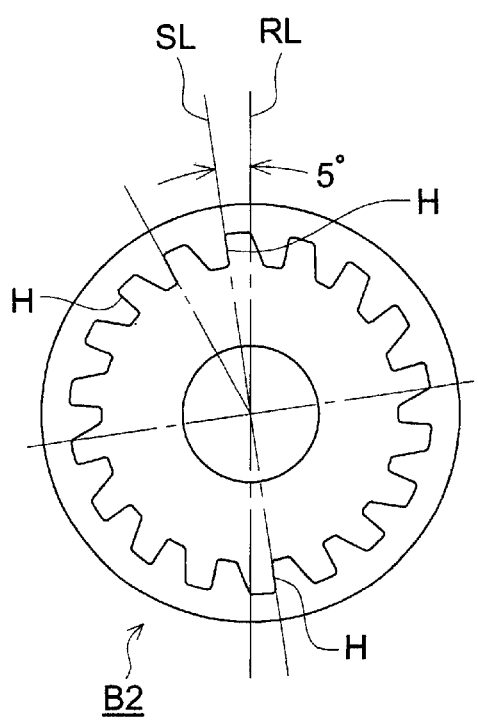

FIG. 4 is a diagram illustrating the play provided between the male coupling section and the female coupling section in the coupling, namely, the state of engagement between a convex portion of the male coupling section and a concave portion of the female coupling section under the loose fitting condition.

In the present embodiment, when $\alpha$ represents a distance between convex portion M1 of male coupling section A in FIG. 4 and concave portion F1 of female coupling section B and $\beta$ represents a distance between convex portion F2 of female coupling B and concave portion M1 of male coupling section A, namely, when $\alpha$ represents a difference between a radius of tangential circle FC1 of the concave portion F1 and a radius of tangential circle MC1 of the tip portion of the convex portion M1 and β represents a difference between a radius of tangential circle FC2 of the convex portion F2 and a radius of tangential circle MC2 of the concave portion M2, a value of α or β whichever smaller is a play.

Each of driving side transmission member X1 having male coupling section A, driven side transmission member X3 and intermediate transmission member X2 having female coupling section B is a member formed to be cylindrical, and convex portions of the male coupling section A and concave portions of the female coupling section B are respectively formed on a circumference, like teeth of a gear. The play is expressed as follows, by the use of a radius of a circumference on which these convex portions and concave portions are formed.

When radius R of male coupling section A is assumed to represent a radius of tangential circle Mc1 or MC2 of male coupling section giving a value of α or α whichever smaller, and when radius r of female coupling section B is assumed to represent a radius of tangential circle Fc1 or FC2 of female coupling section, play ΔR is expressed by ΔR=r−R.

After experiments, it has been cleared that vibration on the driven side can favorably be prevented when driving the driven side to rotate, by making a play to be 0.08 mm or more in a small-sized drive power transmission device as used for an image forming apparatus.

Further, it is especially preferable that a play is made to be 0.2 mm or more. It is actually preferable that a play is made to be 1 mm or less.

When a play is smaller than 0.08 mm, vibration tends to be caused on the driven side. When a play is greater than 1 mm, an intermediate transmission member is greatly inclined under the state where a driven side transmission member is not mounted, easiness for mounting a component to be mounted on or dismounted from tends to be lowered. In addition, strength of the coupling is lowered.

In the present embodiment, strength of a drive power transmission device is improved when an operating point of the coupling section is lowered. This will be explained as follows, referring to FIG. 5(a). FIG. 5(a) and FIG. 5(b) are enlarged views of a coupling section formed by splines. In FIG. 5(a), convex portion M of a coupling section has operating surface H, and the operating surface H engages with corresponding surface K of concave section F to transmit driving power. The operating surface in this case is a surface of the convex portion or the concave portion on the downstream side in the rotational direction in the coupling where the coupling section of the driven side engages with the second intermediate coupling section, and it is a surface of the convex portion or the concave portion on the upstream side in the rotational direction in the coupling where the coupling section of the driven side engages with the second intermediate coupling section.

Relationship between a driving side transmission member and a driven side transmission member for the driving side transmission member and the driven side transmission member is not naturally limited to that shown in FIG. 5(a) and FIG. 5(b), and various combinations are possible.

Incidentally, in the explanation for FIG. 5(a) and FIG. 5(b), a convex portion forming a coupling section is called a tooth, a tip portion of the convex portion is called addendum and a root section of the convex portion is called dedendum.

In FIG. 5(a), operating surface H of convex portion M of a coupling section is composed of straight line section H2 representing a main operating surface, R (Rounded) section H1 of addendum and R section H3 of dedendum. By providing R section H1 on addendum in addition to the straight line section H2 on the operating surface, an operating point representing an operation center of driving power on operating surface H is lowered toward dedendum of the male coupling section. Due to this, strength of the coupling section is enhanced and strength of the drive power transmission device is improved. Though the R section is provided on addendum in the example shown in FIG. 5(a), addendum has only to be chamfered for lowering the operating point, and a shape of a chamfered portion may be R, namely, other curves in a shape of an arc or a straight line.

In the present embodiment, an operating surface on the coupling section is formed on a plane including a rotational axis. Due this, vibration on the driven side is prevented effectively. This will be explained by referring to FIG. 5(b).

It is preferable that operating surface HA of concave portion F of the coupling section is formed on plane HP including rotational axis Pt as shown in FIG. 5(b). By forming the operating surface HA like this, operating force that is received by concave portion F acts in the direction of a tangent on a rotational circle as shown with V1, and the operating force has no power to displace rotational axis Pt.

On the contrary to the foregoing, when operating surface HA is not formed on a plane including a rotational axis like concave portions shown with E, operating force is not in the direction of a tangent on a rotational circle as shown with V2, and there are generated rotation driving force shown with V2a for rotational axis Pt and a component of force to displace rotational axis Pt shown with V2b. As a result, vibration and rotation unevenness are caused.

In the present embodiment, when an expected life of a unit that can be mounted on and dismounted from a main body is shorter than that of the main body, it is possible to lower the rate of troubles in the whole of the drive power transmission device by making the safety factor of the first coupling to be different from that of the second coupling. This will be explained as follows, referring to FIG. 3.

In FIG. 3, when an expected life of a unit that can be mounted on and dismounted from a main body is shorter than that of the main body, it is preferable that the safety factor of the first coupling Y1 is made to be different from that of the second coupling Y2, and it is especially preferable that the safety factor of the coupling between intermediate transmission member X2 and driving side transmission member X1 holding the intermediate transmission member X2 to be movable, or between intermediate transmission member X2 and driven side transmission member X3 is established to be smaller than that of the other side. In this case, making a safety factor to be different from the other means changing of the strength of the coupling, and for example, this can be carried out by changing a material, or by changing a length of the coupling in the axial direction. Therefore, making the safety factor to be smaller is weakening the strength of the coupling, and this can be carried out by using a material having lower strength or shortening a length of the coupling in the axial direction.

Due to this, the safety factor of the coupling of the drive power transmission device is matched with the relationship between a life of the main body and that of a unit to be mounted on or dismounted from the main body that the expected life of the unit to be mounted on or dismounted from the main body is shorter than that of the main body, thus, the rate of troubles of the device can be lowered effectively.

In the present embodiment, an arrangement is made so that an operating surface of intermediate transmission member X2 for driving side transmission member X1 may be deviated in terms of a phase from that of the intermediate transmission member X2 and of the driven side transmission member X3. Due to this, generation of vibration caused by driving power is prevented and vibration on the driven side is prevented.

This will be explained as follows, referring to FIG. 6(a) and FIG. 6(b). FIG. 6(a) and FIG. 6(b) show relationship between coupling section B1 constituting first coupling Y1 in FIG. 3 and coupling section B2 constituting second coupling Y2. Incidentally, FIG. 6(a) shows intermediate transmission member X2 viewed in the direction of W2 in FIG. 3, while, FIG. 6(b) shows intermediate transmission member X2 viewed in the direction of W3 in FIG. 3. As illustrated, the coupling section B1 and the coupling section B2 are formed to be different in terms of a phase. In the coupling section B1, recessed operating surface H is formed on standard line RL, while in the coupling section B2, its phase is established so that the aforesaid recessed portion formed to have pitch angle of 20° may have its operating surface H on line SL deviated from the standard line by 5°.

By establishing phase relationships between the coupling section B5 and the coupling section B2 as stated above, the force applied from the driving shaft to the driven shaft is dispersed in term of progress of time, which eliminates unevenness of rotation of the driven shaft and further represses vibration of the driven shaft.

Next, various embodiments of the invention will be explained as follows, referring to FIG. 7(a), FIG. 7(b) and FIG. 7(c), which are diagrams showing illustratively drive power transmission devices.

Figure 7:
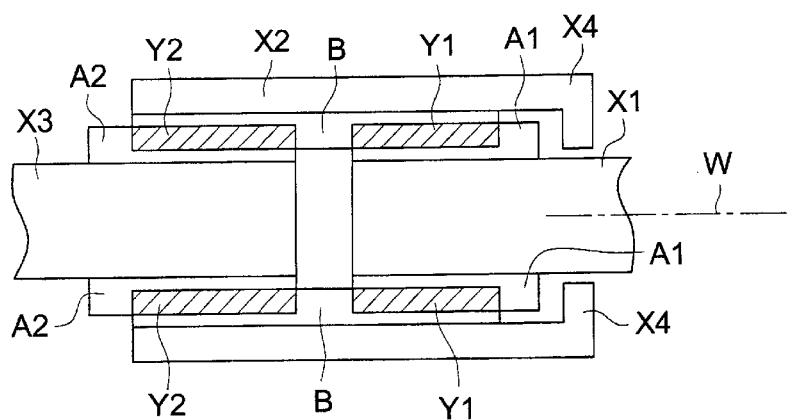
FIG. 7(*a*), FIG. 7(*b*) and FIG. 7(*c*) are diagrams showing illustratively various variations of a drive power transmission device.
Figure 7:
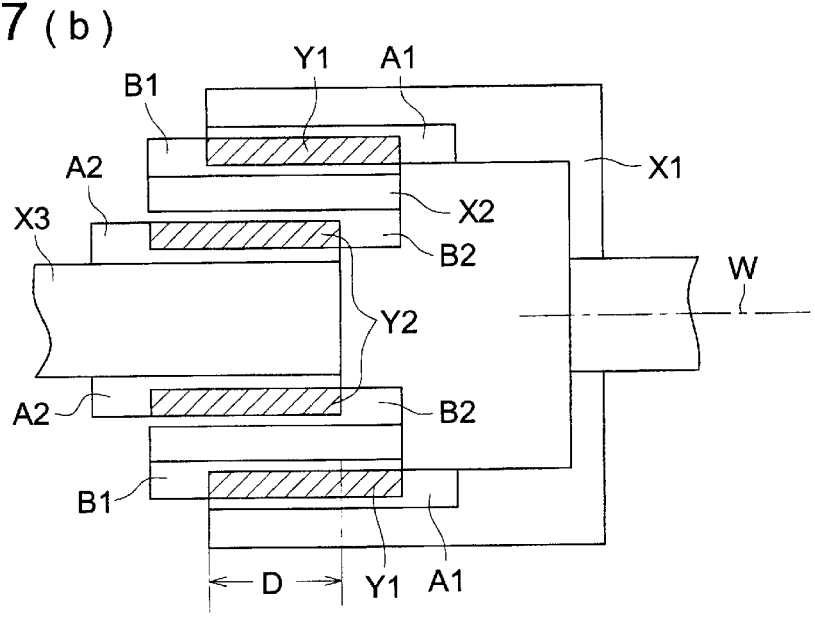
Figure 7:
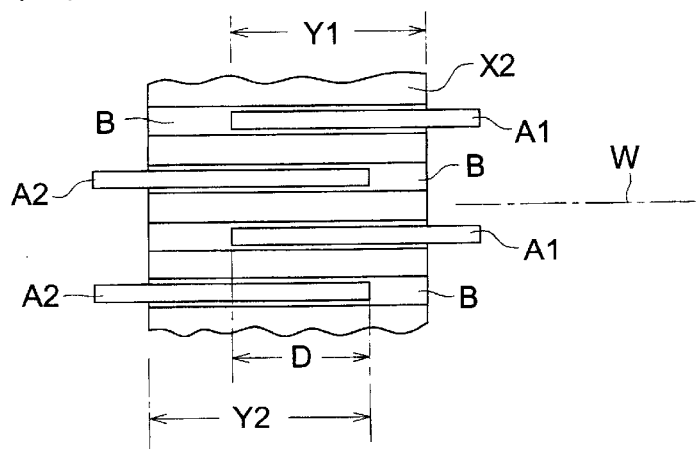

In FIG. 7(a), male coupling section A1 is provided on driving side transmission member X1, female coupling section B is provided on intermediate transmission member X2 and male coupling section A2 is provided on driven side transmission member X3. The female coupling section B is engaged with the male coupling section A1 and the male coupling section A2 in common at positions which are different in rotational axis direction W. Namely, first coupling Y1 formed by the male coupling section A1 and the female coupling section B and second coupling Y2 formed by the male coupling section A2 and the female coupling section B are arranged to be deviated each other in rotational axis direction W.

The intermediate transmission member X2 has stopper section X4, which prevents that the intermediate transmission member X2 leaves when the driven side transmission member X3 is removed. The stopper section X4 is provided on the intermediate transmission member X2, and the stopper section X4 has a hole to which the driven side transmission member X3 is fitted loosely so that the intermediate transmission member X2 may be displaced. A diameter of the hole that is larger than an outside diameter of coupling section X1 makes the intermediate transmission member X2 to be held on the driving side transmission member X1 to be capable of being displaced.

FIG. 7(b) shows the structure wherein the driving side transmission member X1 has female coupling section A1, male coupling section B1 and female coupling section B2 are formed on the intermediate transmission member X2, and the female coupling section B2 is made to engage with male coupling section A2 of the driven side transmission member X3, and thereby, first coupling Y1 and second coupling Y2 are not overlapped each other in rotational axis direction W except a range of D where they are overlapped partially, and thus, a tolerance of deviation between the driving shaft and the driven shaft is increased. In the example shown in FIG. 7(b), coupling section A1 corresponds to male coupling section 144 in FIG. 1, coupling section B1 corresponds to female coupling section 124, coupling section B2 corresponds to female coupling section 122 and coupling section A2 corresponds to male coupling section 102, though relationship of correspondence between male and female is partially different.

Incidentally, it is also possible to employ the structure wherein a male coupling section is provided on the driven side transmission member, a female coupling section and a male coupling section are provided on the intermediate transmission member, and a female coupling section is provided on the driven side transmission member.

FIG. 7(c) is a diagram showing exploded first coupling Y1 and second coupling Y2, and it shows an arrangement example wherein a plurality of concave portions forming coupling section B of intermediate transmission member X2 are made to engage alternately with convex portions of coupling section A1 of the driving side transmission member (not shown) provided on the driving shaft and with convex portions of coupling section A2 of the driven side transmission member (not shown) provided on the driven shaft, and thereby the first coupling Y1 and the second coupling Y2 are overlapped each other and are arranged at positions which are deviated in the direction of rotational axis W.

(2) Image Forming Apparatus

Figure 8:
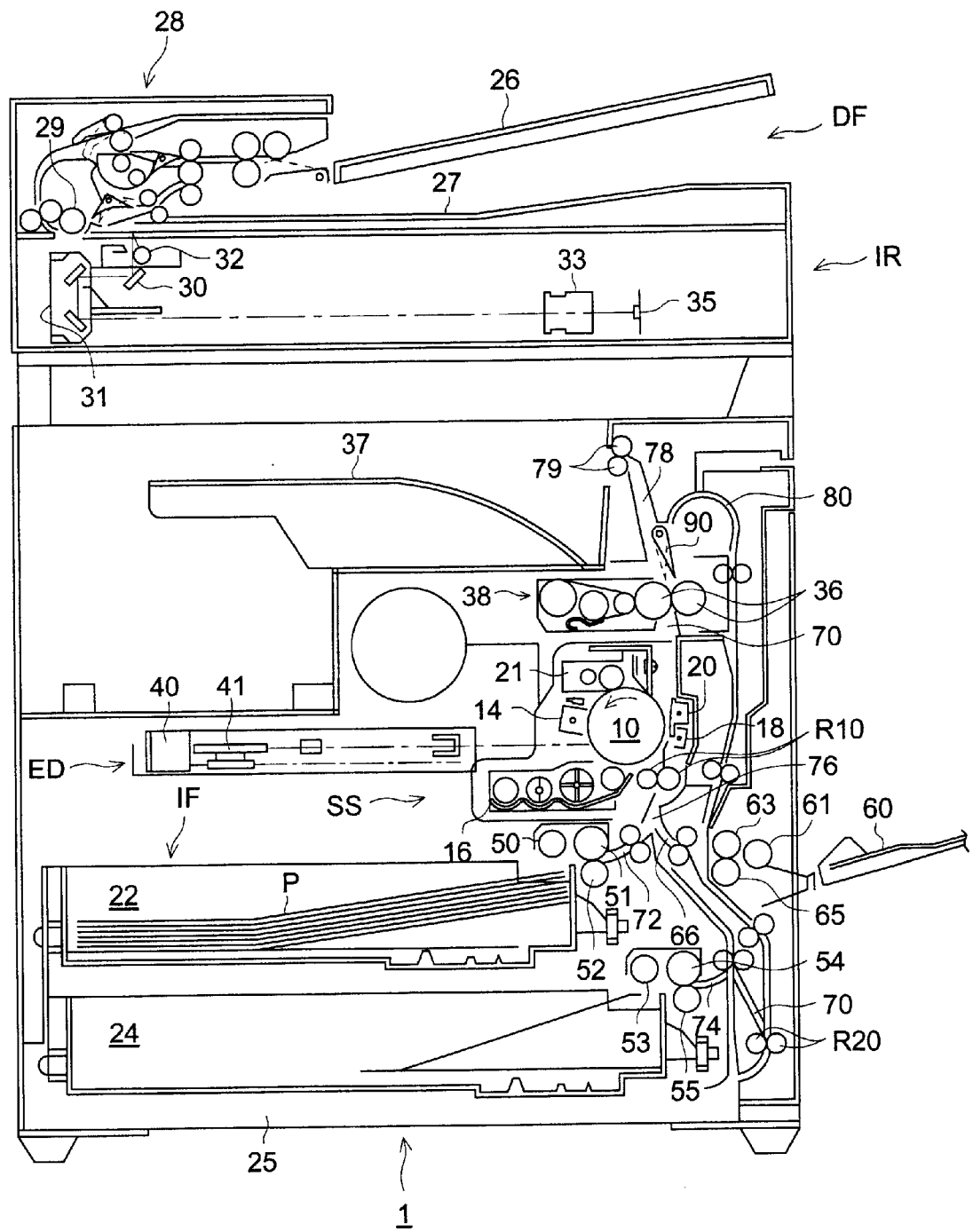
FIG. 8 is a diagram showing an image forming apparatus relating to an embodiment of the invention.

The structure of an image forming apparatus in the embodiment of the invention will be explained as follows, referring to FIG. 8.

In the drawing, image forming apparatus 1 is composed of automatic document feeder DF, document image reader IR for reading an image on a document conveyed by the automatic document feeder DF, exposure device ED that gives exposure, in accordance with data after image processing, to drum-shaped photoreceptor 10 representing an image carrier, and of photoreceptor 10, and there are provided, around the photoreceptor, image forming section IF including charging electrode 14 representing a charging means, developing device 16 composed of a developing device of a magnetic brush type, transfer electrode 18 representing a transfer means, separation electrode 20 representing a separation means and cleaning device 21, and a storing section SS for sheet feeding trays 22 and 24 each storing recording sheet P. The charging electrode 14, the exposure device ED and the developing device 16 constitute a toner image forming means that forms a toner image on an image carrier.

It is also possible to use a dielectric substance and an intermediate transfer body for the image carrier, in addition to photoreceptor 10. It is further possible to use an electrostatic image forming means such as a needle electrode and a screen electrode and a developing device for the toner image forming means stated above.

Main factors of the automatic document feeder DF include document stand 26 and document conveyance processing section 28 that includes a roller group including roller 29 and a switching means (having no symbols) for switching a path for movement of a document in case of need.

The document image reader IR is located below platen glass 27, and it is composed of two mirror units 30 and 31 capable of reciprocating by keeping an optical path length, fixed image forming lens (hereinafter referred to simply as a lens) 33 and linear image pick-up element (hereinafter referred to as CCD) 35.

The exposure device ED has therein laser diode 40 representing a light-emitting element, rotary polygon mirror 41 representing a polarizing means, and a driving circuit representing a driving means that generates pulses for driving the laser diode 40, and it is formed as a unit as illustrated.

Numeral R10, shown at this side of transfer electrode 18 when viewed from the movement direction of recording sheet P, is a registration roller, and one shown with the numeral 36 at the downstream side of separation electrode 20 is a fixing device.

The fixing device 36 is composed of a roller having therein a built-in heating source and of a pressure-contact roller that rotates while being in pressure contact with the aforesaid roller.

The numeral 38 represents a cleaning means for the fixing device 36, and its main factor is a cleaning web that is provided to be capable of being taken up.

When a of documents (not shown) placed on the document stand 26 is passing below the roller 29 after being conveyed by the document conveyance processing section 28, the sheet is illuminated by illuminating means 32.

Reflected light from a document passes through mirror units 30 and 31 located at fixed positions and through lens 33, and it is formed on CCD 35 as an image which is then read.

Image information, obtained through reading by the document image reader IR, are processed to be image data which are stored in a memory that is not shown.

The image data are read out of the memory in the case of image forming, and laser diode 40 representing a light-emitting element in the exposure device ED is driven in accordance with the aforesaid image data read out, and thereby, photoreceptor 10 is exposed to light.

Prior to the exposure, photoreceptor 10 rotating in the arrow direction (counterclockwise) is given a prescribed surface voltage by corona discharge action of charging electrode 14. After the exposure, voltage on the exposed area is lowered in accordance with an amount of the exposure, resulting in formation of an electrostatic latent image on photoreceptor 10 corresponding to image data.

The electrostatic latent image is subjected to reversal development conducted by developing device 16, and a toner image is formed. On the other hand, before the leading edge of the toner image on the photoreceptor 10 arrives at the transfer area, a sheet of recording sheets P in sheet feeding tray 22, for example, is fed out and conveyed to arrive at registration roller RIO to be regulated in terms of position.

Recording sheet P is conveyed toward the transfer area by registration roller RIO that starts rotating to synchronize so that the recording sheet P may be overlapped with the toner image, namely, with the image area on the photoreceptor 10.

In the transfer area, the toner image on the photoreceptor 10 is transferred onto the recording sheet P by charging made by transfer electrode 18, and then, the recording sheet P is separated from the photoreceptor 10 by neutralizing made by separation electrode 20.

After that, the toner image is fused and fixed on the recording sheet P by pressing and heating in the fixing device 36, and the recording sheet P is ejected out to sheet ejection tray 37 through sheet ejection path 78 and sheet ejection roller 79.

Sheet feeding trays 22 and 24 are arranged to be on a vertical double decks in the present embodiment, and it is also possible to provide more sheet trays.

There is formed space section 25 having a prescribed clearance between a bottom portion (same as a bottom wall in meaning) of sheet feeding tray 24 arranged on the lower deck (which means the lowest deck in the case where the number of decks is other than two in the present embodiment) among sheet feeding trays and the bottom wall of the apparatus main body.

The space section 25 is one to be used in the mode to form images on both sides of recording sheet P, and it contributes to achievement of reversing a recording sheet from obverse to reverse or vice versa together with second conveyance path 80 for reversing a recording sheet from obverse to reverse or vice versa (described later).

Each of the numerals 50 and 53 shown over the tip portions (corresponding to the leading edge of recording sheet P stored when viewed in the sheet feeding direction) of sheet feeding trays 22 and 24 is a sheet feeding means (hereinafter referred to as a feed-out roller) composed of a roller, each of the numerals 51 and 54 is a feed roller, and each of 52 and 55 is a double-feed-prevention roller.

Feed-out rollers (50, 53) and feed rollers (51, 54) are unitized to have the structure wherein both of them can easily be mounted on or dismounted from a driving shaft connected with a driving source provided on the apparatus main body side or an engagement means provided on the sheet feeding section.

Further, the double-feed-prevention rollers (52, 55) are unitized to have the structure wherein they can easily be mounted on or dismounted from a fixed member provided at the fixing section on the apparatus main body.

The numeral 60 is a bypass sheet feeding tray in the bypass sheet feeding section, and it is constructed so that it may be opened and closed with its lower end functioning as the fulcrum on the main body side wall of image forming apparatus 1.

Numeral 61 represents a feed-out roller composed of a roller for feeding out a recording sheet placed on the bypass sheet feeding tray 60 in the course of image forming, numeral 63 represents a feed roller provided at the downstream side of the feed-out roller 61, and numeral 65 represents a double-feed-prevention roller that is in pressure contact with the feed roller 63, prevents double-feeding of recording sheet P and has the structure that is essentially the same as in the case of the sheet feeding trays 22 and 24 stated above.

A conveyance path for recording sheet P fed out of bypass sheet feeding tray 60 is represented by 66, and the conveyance path passes through a pair of conveyance rollers shown on the left side of the feed roller 63, and is communicated with a junction described later.

Numeral 70 represents a first conveyance path for making image forming by transfer to be conducted on recording sheet P, and it is extended from the bottom toward the top when viewed in the direction of movement of a recording sheet fed out of a concerning sheet feed tray.

A sheet feeding path for a recording sheet stored in sheet feeding tray 22 on the upper deck is represented by numeral 72, and numeral 74 represents a sheet feeding path for a recording sheet stored in sheet feeding tray 24 on the lower deck, while, numeral 76 represents a junction section (a part of the first conveyance path 70) where recording sheet P conveyed from the sheet feeding tray 22 and recording sheet P conveyed from the sheet feeding tray 24 join.

Numeral 78 is a sheet ejection path for ejecting a recording sheet on which a prescribed image has been formed onto sheet ejection tray 37.

Numeral 80 represents a second conveyance path for reversing a recording sheet from obverse to reverse or vice versa that is used in the case of forming images on both sides of a recording sheet, and it is communicated with the first conveyance path on the upper portion in the drawing.

The second conveyance path 80 is extended from the top to the bottom when viewed in the direction of movement of a recording sheet.

A lower end portion of the second conveyance path 80 is made to be a conveyance path extending almost vertically, and its lower end extends to be lower than a sheet feeding portion of the sheet feeding tray 24 on the lower deck, and is connected (communicated) with the first conveyance path 70.

As is understood from the foregoing, the first conveyance path 70 and the second conveyance path 80 form a loop shape that is long in the longitudinal direction on the side wall of the apparatus main body.

On the connection portion where the first conveyance path 70 and the second conveyance path 80 are connected to each other, there is provided conveyance means R20 composed of a pair of rollers capable of rotating reversely.

The connection portion may also be called a junction that switches both conveyance paths, because recording sheet P is not conveyed continuously from the second conveyance path 80 to the first conveyance path 70.

Under roller R20 for switchback, there is provided a path communicated with space section 25, and the path is used to make recording sheet P moving through second conveyance path 80 to head for the space section 25, when reversing recording sheet P from obverse to reverse or vice versa.

In the image forming process, an arrangement is made so that the trailing edge of the recording sheet P is held by the roller R20 for switchback when recording sheet P moving through the second conveyance path 80 is fed out toward the space section 25, and therefore, a part of the recording sheet is stored in the space section 25.

Numeral 90 represents an (upper) branch guide, and it is controlled to make the recording sheet P having an image formed on its first side to head for sheet ejection path 78 or for second conveyance path 80. The branch guide 90 is controlled in accordance with a single-side mode and a two-side mode to switch the recording sheet conveyance path.

For example, when the mode to conduct image forming on both sides of a recording sheet is established, the branch guide 90 is located at the position shown with broken lines in the drawing to feed recording sheet p on which an image is formed on its first side to turn in a transferred toner image into second conveyance path 80, and after feeding the recording sheet into the second conveyance path 80, the branch guide 90 is controlled through an unillustrated control section to take the position shown with solid lines in the drawing.

Incidentally, members (having no reference symbols) positioned on the first conveyance path 70 and the second conveyance path 80 and are shown with a pair of circles represent conveyance rollers.

The image forming process for the second side of the recording sheet in the image forming apparatus of the aforesaid structure is as follows.

As stated above, when the recording sheet P having an image on its first side moves upward through the first conveyance path 70 and when its leading edge arrives at the branch guide 90, the branch guide 90 is kept at the position shown with broken lines in the drawing. Therefore, the recording sheet P enters the second conveyance path 80 and keeps moving.

An entrance portion of the second conveyance path 80 forms a gentle arc which assures smooth movement of the recording sheet P.

When the recording sheet P moves downward through the second conveyance path 80 and arrives at its lower end, the recording sheet P is interposed by rollers R20 for switchback to be conveyed downward to come off the second conveyance path, and is guided to space section 25 formed below the lower sheet feeding tray 24.

In this case, the first side of the recording sheet P on which an image has been formed faces downward.

Then, the rollers R20 for switchback stop rotating in the state wherein the trailing edge of the recording sheet P is interposed by the rollers R20 for switchback, and after that, when the rollers R20 for switchback start rotating in the opposite direction, the recording sheet P is fed into the first conveyance path 70 under the condition that the recording sheet is reversed from inside to outside, namely, under the condition that the second side on which an image has not been formed faces to the photoreceptor 10 side, and the leading edge of the recording sheet P is regulated by registration roller R10.

On the other hand, on the photoreceptor 10, there is formed a second toner image through the aforesaid process, and when registration roller R10 starts rotating in synchronization with rotation of the photoreceptor 10, the recording sheet P enters a transfer area to be overlapped with the second toner image area.

After that, when the leading edge of the recording sheet P which has been subjected to transfer processing, separation processing and fixing processing arrives at a certain portion of the branch guide 90, the branch guide 90 is kept at the position shown with solid lines in the drawing in advance to communicate the first conveyance path 70 with sheet ejection path 78, and communication with the second conveyance path 80 is cut, therefore, the recording sheet P enters the sheet ejection path 78 to be ejected on sheet ejection tray 37 through sheet ejection roller 79. Thus, an image is formed on the recording sheet.

Figure 9:
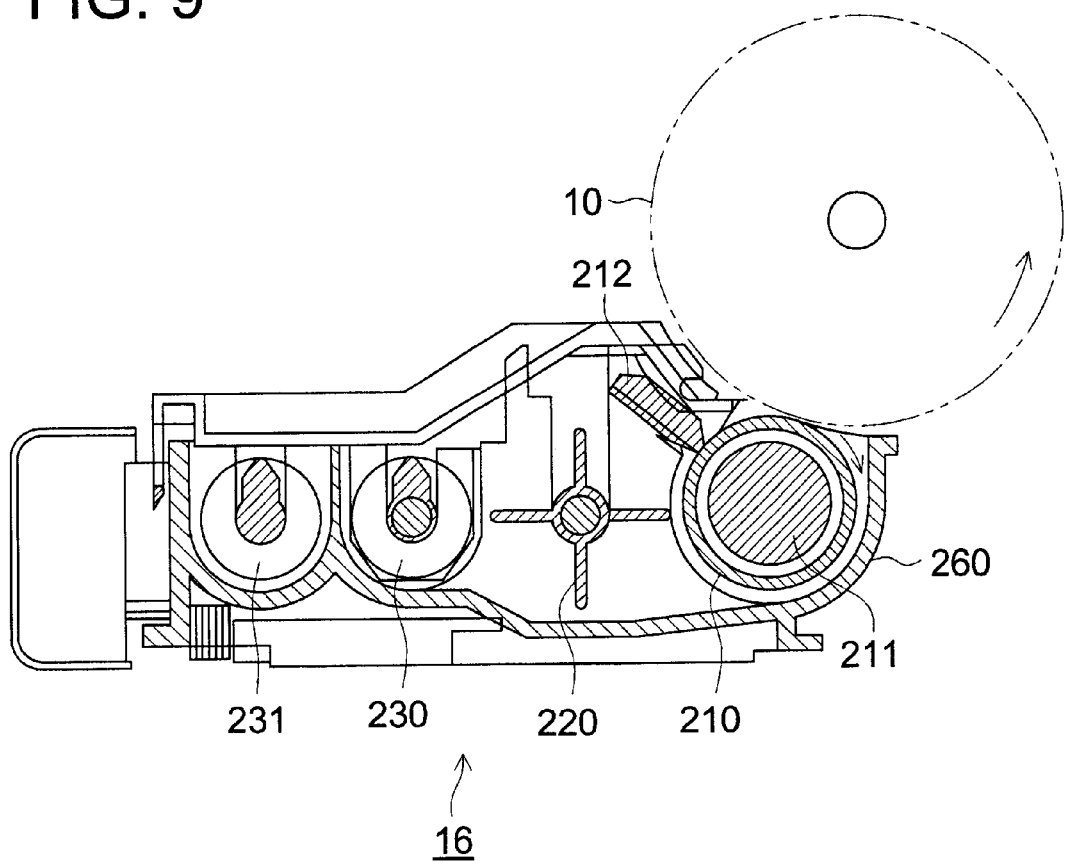
FIG. 9 is a sectional view of a developing device.

FIG. 9 is a sectional view of developing device 16. Inside outer frame 260 of the developing device 16, there are provided developing sleeve 210, blade wheel 220, and stirring conveyance screws 230 and 231. Inside the developing sleeve 210, there is provided fixed magnet 211, and developing agent regulating plate 212 is provided to face the developing sleeve 210. Two-component developing agent including toner and carrier is stored in the developing device, and toner supplied through an unillustrated opening is stirred and conveyed by the stirring conveyance screws 230 and 231 to be supplied to the blade wheel 220, and the blade wheel 220 that rotates in the arrowed direction supplies toner on the developing sleeve 210. The developing sleeve 210 rotates in the arrowed direction, and due to this rotation, developing agent on the developing sleeve 210 is regulated by the developing agent regulating plate 212 to be supplied to the developing position where the developing sleeve 210 faces photoreceptor 10.

Figure 10:
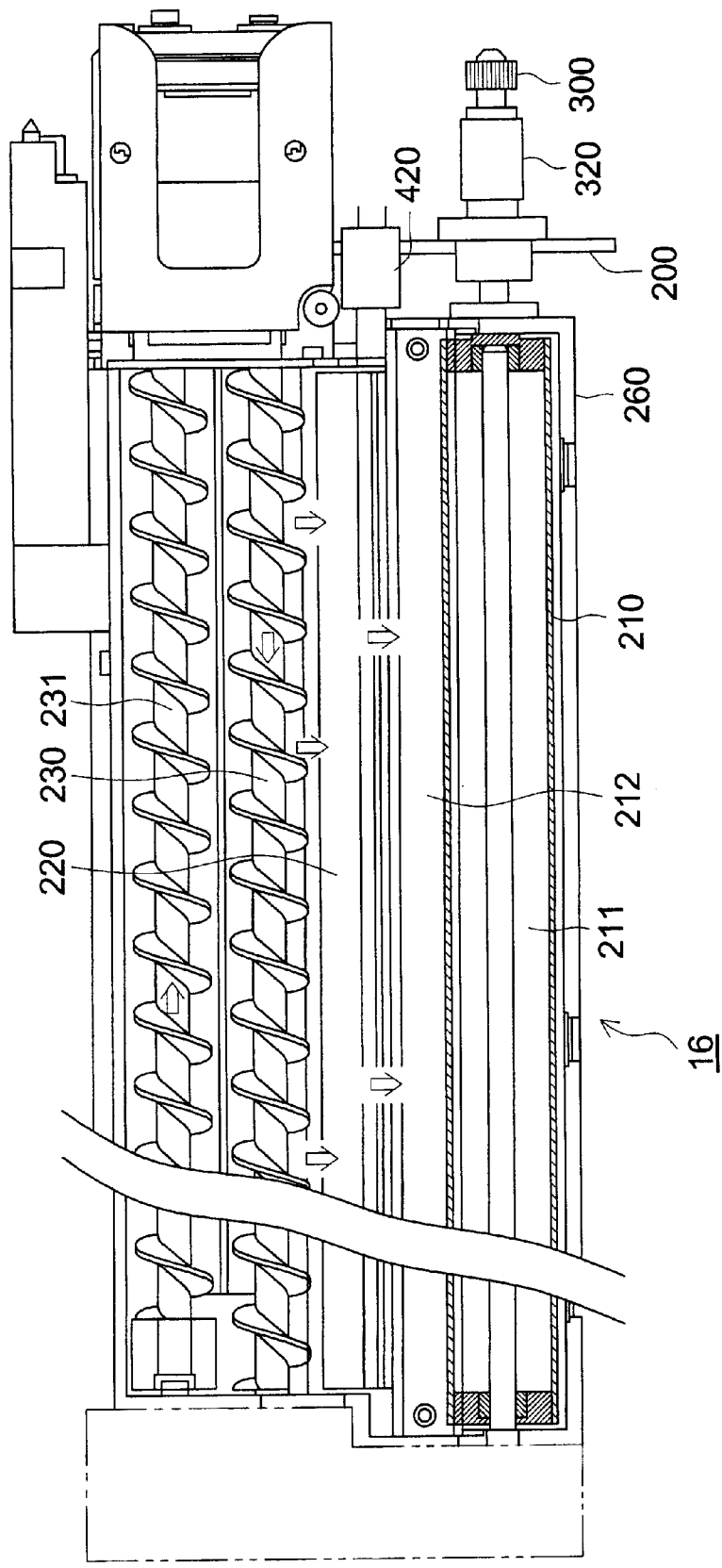
FIG. 10 is a top view of a developing device.

FIG. 10 is a plan view of developing device 16.

Developing agents are conveyed in the white arrow direction by rotation of stirring conveyance screws 230 and 231 and of blade wheel 220, and are supplied to developing sleeve 210.

Figure 11:
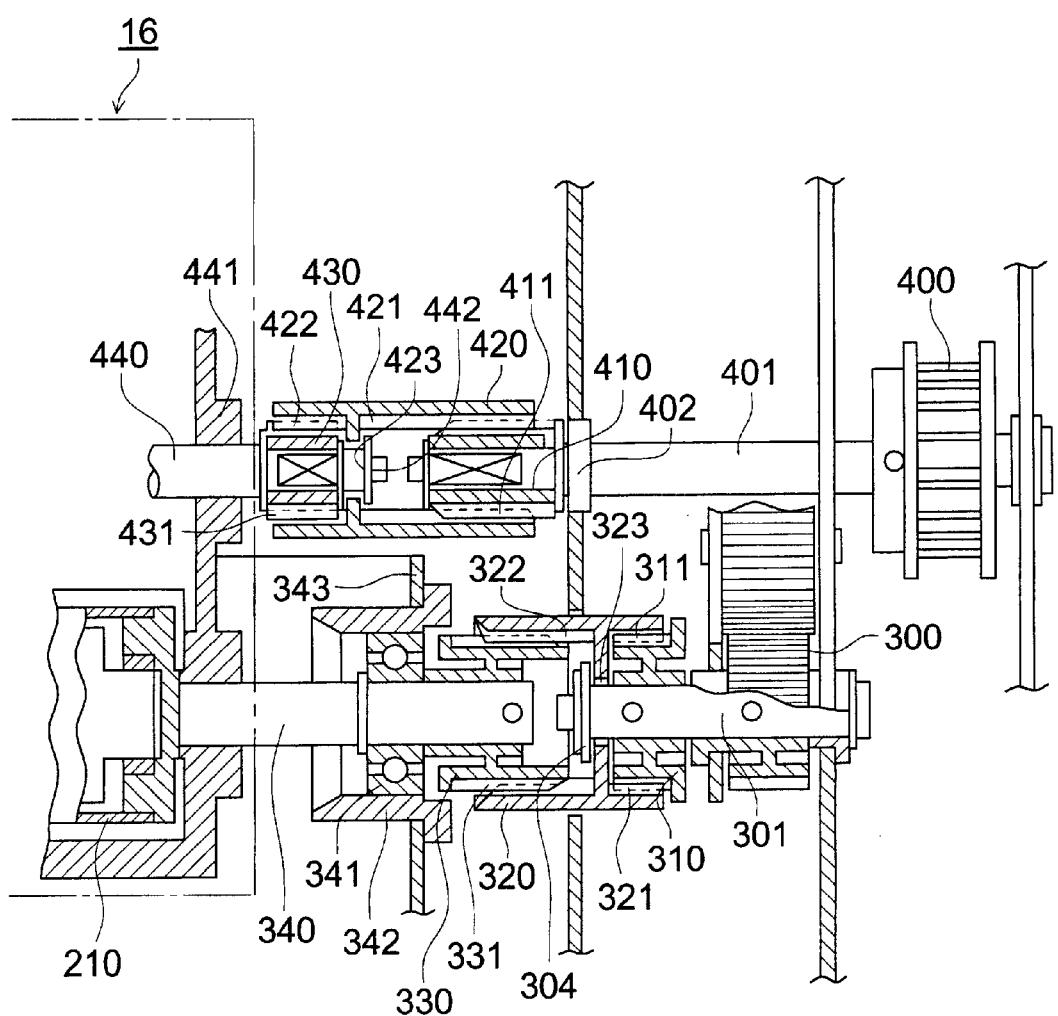
FIG. 11 is a sectional view of a drive power transmission section of a developing device.

Next, rotation drive of developing sleeve 210 and rotation drive of blade wheel 220 and of stirring conveyance screws 230 and 231 will be explained as follows, referring to FIG. 11. In the present embodiment, developing sleeve 210, blade wheel 220 and stirring conveyance screws 230 and 231 are driven respectively by different driving sources.

Developing sleeve 210 is driven to rotate by driving power transmitted by gear 300 from an unillustrated motor. Gear 300 and driving side transmission member 310 are fixed on driving shaft 301, and the driving side transmission member 310 rotates integrally with gear 300.

Intermediate transmission member 320 has female coupling section 321, which engages with male coupling section 311 of the driving side transmission member 310. The intermediate transmission member 320 has female coupling section 322.

Driven shaft 340 on which the developing sleeve 210 is supported rotatably by supporting member 342 fixed on an image forming apparatus main body through bearing 341. Male coupling section 331 of driven side transmission member 330 engages with female coupling section 322 of intermediate transmission member 320.

Owing to the drive power transmission mechanism, namely, owing to coupling between male coupling section 311 of driving side transmission member 310 and female coupling section 321 of intermediate transmission member 320 and to coupling between female coupling section 322 of intermediate transmission member 320 and male coupling section 331 of driven side transmission member 330, rotation is transmitted from driving shaft 301 to driven shaft 340, and thus, developing sleeve 210 is rotated.

Blade wheel 220 is fixed on driven shaft 440 and is rotated by drive power transmitted to pulley 400 that is driven by an unillustrated motor.

On driving shaft 401 on which a pulley is fixed, there is fixed driving side transmission member 410. The driving side transmission member 410 has male coupling section 411, which engages with female coupling section 421 of intermediate transmission member 420. The intermediate transmission member 420 has female coupling sections 421 and 422, and the female coupling section 422 engages with male coupling section 431 of driven side transmission member 430 that is fixed on driven shaft 440 on which the blade wheel 220 is fixed. As stated above, power is transmitted from driving shaft 401 to driven shaft 440 by both coupling formed with male coupling section 411 of driving side transmission member 410 and with female coupling section 421 of intermediate transmission member 420 and coupling formed with female coupling section 422 of intermediate transmission member 420 and with male coupling section 431 of driven side transmission member 430.

Developing device 16 is detachably mounted on an image forming apparatus main body. In the driving mechanism stated above, with regard to the driving mechanism of developing sleeve 210, driven shaft 340 and driven side transmission member 330 are provided on developing device 16 which is mounted on and dismounted from the image forming apparatus main body, while, intermediate transmission member 320, driving side transmission member 310 and driving shaft 301 are provided on the image forming apparatus main body. The intermediate transmission member 320 has hole 323 that is slightly larger than a diameter of driving shaft 301, and the driving shaft 301 is inserted in the hole 323 with a play. On the driving shaft 301, there is provided stopper ring 304 which prevents the intermediate transmission member 320 from coming off the image forming apparatus main body when the developing device 16 is taken out and the driven side transmission member 340 is removed accordingly. Namely, the intermediate transmission member 320 is movably supported on the driving side transmission member 310.

In the driving mechanism of blade wheel 220, driven side transmission member 430 and intermediate transmission member 420 are provided on developing device 16 which is mounted on and dismounted from the image forming apparatus main body. The intermediate transmission member 420 has hole 423 that is slightly larger than a diameter of driven shaft 440, and the driven shaft 440 is inserted in the hole 423 with a play. On the driven shaft 440, there is fixed stopper ring 442 which prevents the intermediate transmission member 420 from coming off when the intermediate transmission member 420 is taken out as a part of the developing device 16. Namely, the intermediate transmission member 420 is movably supported on the driven side transmission member 430.

In the image forming apparatus stated above, there has been shown an example of a developing unit wherein developing device 16 is unitized as a process cartridge capable of being mounted and dismounted, and the process cartridge includes the following various ones which can be mounted detachably on the image forming apparatus.

(1) Image Forming Body

An image forming body such as a photoreceptor is formed to be a process cartridge as an image forming body unit.

(2) Photoreceptor and Charging Electrode

A photoreceptor and a charging electrode are formed to be a process cartridge.

(3) Photoreceptor, Charging Electrode and Developing Device

A photoreceptor, a charging electrode and a developing device are formed to be a process cartridge.

(4) Photoreceptor, Charging Electrode, Developing Device and Cleaning Device

A photoreceptor, a charging electrode, a developing device and a cleaning device are formed to be a process cartridge.

(5) Color Process Cartridge

Developing devices respectively for yellow, magenta, cyan and black are formed to be one process cartridge which is mounted on and dismounted from an image forming apparatus main body. In the process cartridge like this, there may also be incorporated a photoreceptor and a charging electrode in addition to the developing device mentioned above.

(6) Image Holding Body

An image holding body such as an intermediate transfer body that holds a transferred toner image temporarily is formed on a process cartridge as an image holding body unit.

(7) Intermediate Transfer Body and Another Process Section

An intermediate transfer body and at least one of process sections described in aforesaid items (1)–(5) are formed to be a process cartridge.

EXAMPLE

Figure 12:
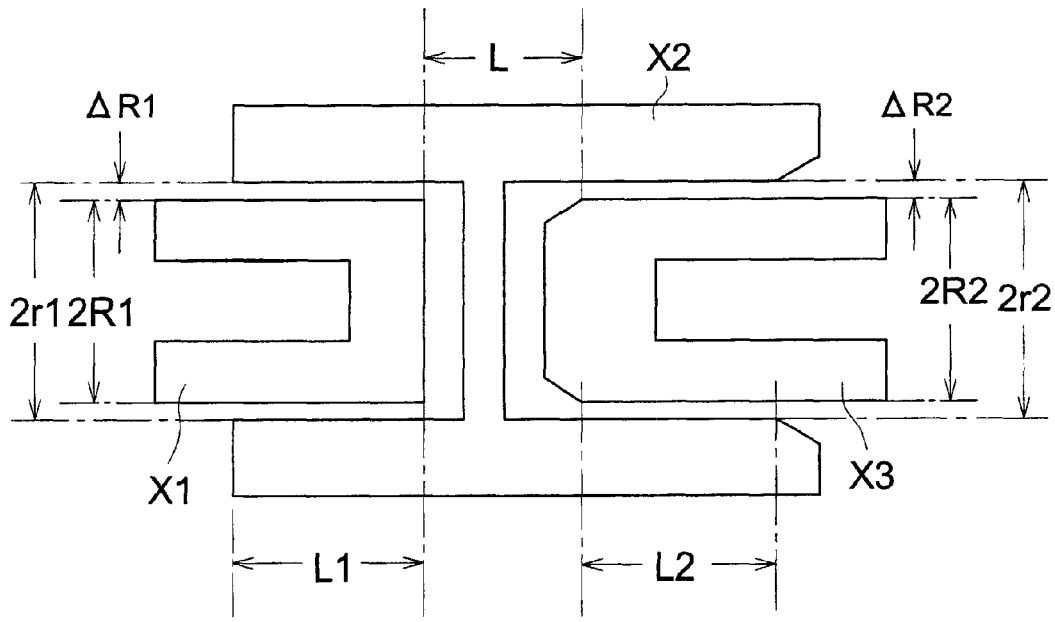
FIG. 12(*a*) and FIG. 12(*b*) are diagrams showing illustratively a drive power transmission device in an example of the invention.
Figure 12:
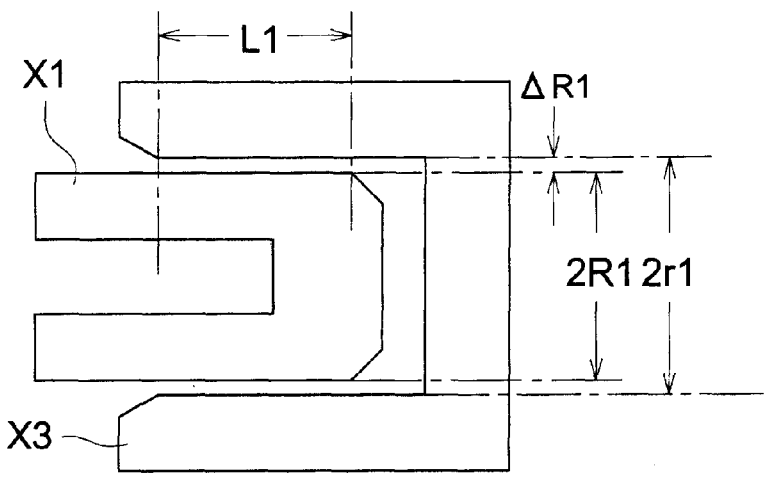

Vibration of the developing device of an image forming apparatus was examined by making the developing device to be a process cartridge and by driving a developing sleeve of the developing device to rotate with a drive power transmission device shown in FIG. 12(a) and FIG. 12(b), having the following dimensions and serving as a drive power transmission device for a developing sleeve.

Let it be assumed that R1 represents a radius of a male coupling section of driving side transmission member X1, r1 represents a radius of a female coupling section of intermediate transmission member X2 engaging with the aforesaid male coupling section, R2 represents a radius of a coupling section of driven side transmission member X3 and r2 represents a radius of a coupling section of the intermediate transmission member X2 engaging with the aforesaid coupling section. Let it be assumed that L represents a distance between a first coupling between the driving side transmission member X1 and the intermediate transmission member X2 and a second coupling between the driven side transmission member X3 and the intermediate transmission member X2, L1 represents a length of the first coupling and L2 represents a length of the second coupling mentioned above.

In the present example, vibration of the driven side was measured when the driven side was driven to rotate under the conditions of L1=L2=6 mm, L=8 mm and ΔR=r1−R=r2−R2=0.85 mm.

Further, as a comparative example, there was used a drive power transmission device having one step of coupling wherein radii of a male coupling section and a female coupling section and a length of a coupling are the same as those shown in FIG. 12(a), X1 having a male coupling section is made to be a driving side transmission member as shown in FIG. 12(b), and X3 having a female coupling section is made to be a driven side transmission member.

Figure 13:
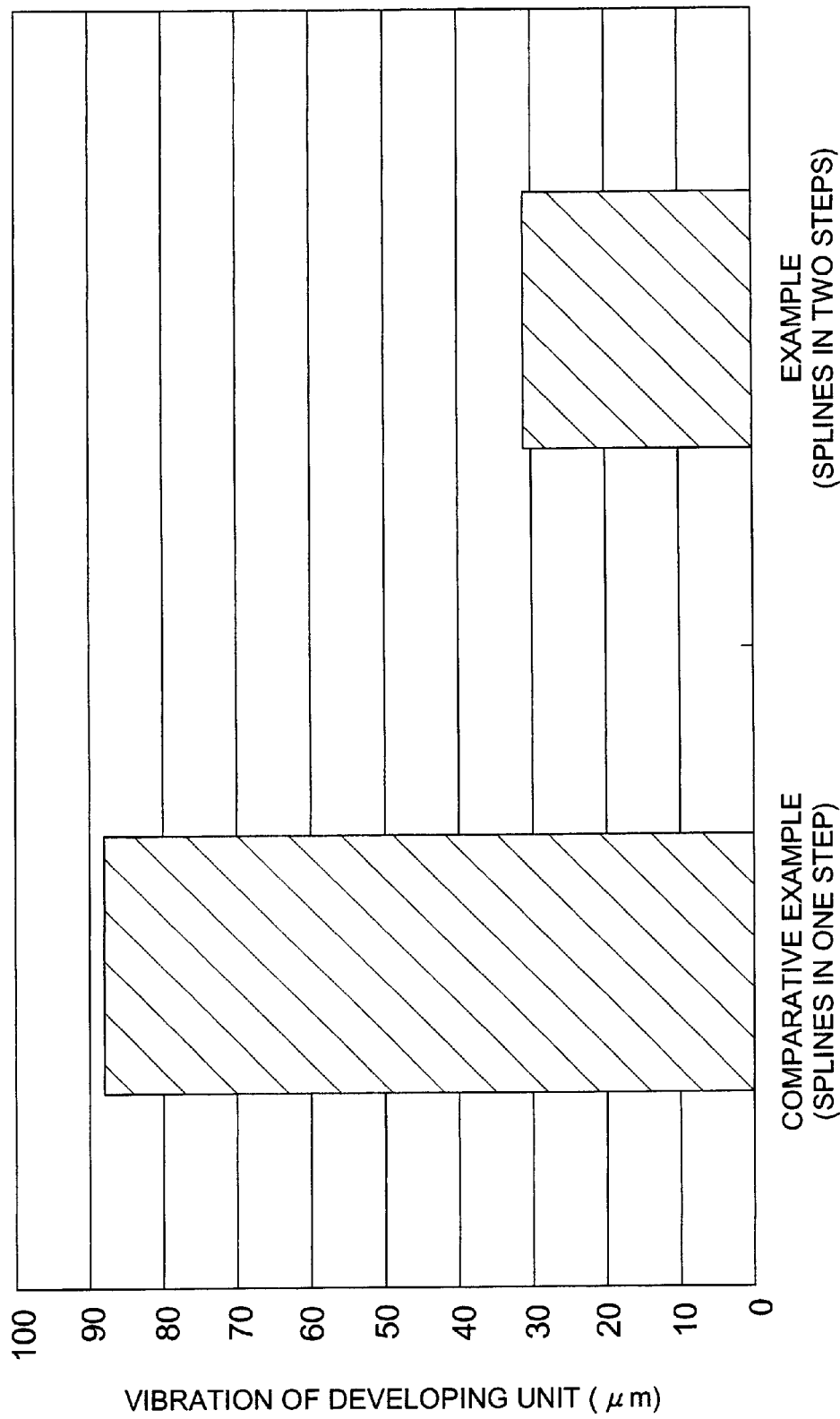
FIG. 13 is a graph showing vibration characteristics in an example of the invention.

As a result, vibration in the example employing two steps of coupling was much less than that in the comparative example employing one step of coupling composed of a male coupling and a female coupling, as shown in FIG. 13. Incidentally, vibration data shown in FIG. 13 represent a value of a frequency component for one turn obtained by measuring with a laser displacement gage (LK 2500 made by Kyence Co.) and by conducting FFT analyses.

Although it has been extremely difficult, in a prior art, to sufficiently repress a vibration generated on the driven side when driving a component to be mounted or dismounted, the invention makes it possible to repress the vibration sufficiently.

The invention makes it possible to repress a vibration on the driven side extremely effectively.

According to the present invention, a vibration on the driven side is repressed further favorably.

The invention prevents that an intermediate transmission member that accelerates vibration on the driven side comes off when the driven side is removed.

According to the present invention, a vibration on the driven side is repressed effectively.

In the invention, signals on the driven side are prevented extremely favorably, because an effect of power to displace a rotational axis of a driven side transmission member has been eliminated.

The invention makes it possible to enhance strength of a drive power transmission device effectively. According to the present invention, it is possible to enhance strength of a coupling on the portion where mounting and dismounting operations are conducted.

According to the present invention, strength of a coupling can be improved, and strength of a drive power transmission device can be improved effectively.

According to the present invention, drive power to be transmitted from a driving side transmission member to a driven side transmission member is dispersed on a time series basis to act on the driven side transmission member, and therefore, vibration of the driven side transmission member is prevented extremely effectively.

The invention effectively prevents the vibration generated periodically.

The invention prevents vibration of rotary members in a cartridge that is mounted on or dismounted from an image forming apparatus. As a result, an image with high image quality can be formed.

The invention makes it possible to form a color image with high image quality.

The invention makes it possible to realize a process cartridge which is mounted on an image forming apparatus to form an image with high image quality.

The invention makes it possible to realize a process cartridge which is mounted on an image forming apparatus to form an image with high image quality and offers excellent workability when mounting on or dismounting from the image forming apparatus.

The invention prevents that an intermediate transmission member comes off when removing a process cartridge from an image forming apparatus main body.

The invention makes it possible to realize a process cartridge which can easily be mounted on or dismounted from an image forming apparatus main body and hardly has vibration when acting for image forming.

Disclosed embodiment can be varied by a skilled person without departing from the spirit and scope of the invention.

What is claimed is:

1. An apparatus for forming an image on a recording medium, which has a process cartridge detachably mounted thereto, said process cartridge including at least one element-device, such as a photoreceptor device, an exposure device, a developing device, a charging device and a cleaning device, said apparatus comprising:

a driving source to generate a rotational-driving force, which is transmitted to at least said process cartridge when said process cartridge is mounted on said apparatus; and a spline joint section to transmit said rotational-driving force from said driving source to said process cartridge when said process cartridge is mounted on said apparatus;

wherein said spline joint section comprises:
a first male-spline member, which is fitted on a driving axis of said driving source, and an outer surface of which is splined into a plurality of first protrusions;
a second male-spline member, which is fitted on a driven axis of said process cartridge, and an outer surface of which is splined into a plurality of second protrusions; and
an intermediate female-spline member, a driving side inner surface of which is splined into a plurality of third protrusions while a driven-side inner surface of which is splined into a plurality of fourth protrusions;

wherein said first protrusions are loosely engaged with said third protrusions with play therebetween and said second protrusions are loosely engaged with said fourth protrusions with play therebetween;

wherein either said first male-spline member or said second male-spline member is disengaged from said intermediate female spline member only by drawing either said first male-spline member or said second male-spline member in a direction of either said driving axis or said driven axis when said process cartridge is dismounted from said apparatus; and wherein each of said first and third protrusions has an affecting surface whose direction coincides with a radial line of each of said first male-spline member and intermediate female-spline member, and when transmitting said rotational-driving force from said first male-spline member to said intermediate female-spline member affecting surfaces of said first protrusions press-contact affecting surfaces of said third protrusions, so that a component force of said rotational-driving force is not generated in a direction other than that orthogonal to said affecting surface.

2. The apparatus as defined by claim 1, wherein said intermediate female-spline member is coupled to either said driving axis or said driven axis such that there is relative movement therebetween, so that said intermediate female-spline member does not dropout from either said driving axis or said driven axis when said process cartridge is removed from said apparatus.

3. The apparatus as defined by claim 1, wherein a top corner of said affecting surface is chamfered.

4. The apparatus as defined by claim 1, wherein said relative movement between said first male-spline member and said intermediate female-spline member is in a range of 0.08 mm–1 mm.

5. The apparatus as defined by claim 1, wherein each of said second and fourth protrusions has an affecting surface whose direction coincides with a radial line of each of said second male-spline member and intermediate female-spline member, and when transmitting said rotational-driving force from said intermediate female-spline member to said second male-spline member affecting surfaces of said fourth protrusions press-contact affecting surfaces of said second protrusions, so that a component force of said rotational-driving force is not generated in a direction other than that orthogonal to said affecting surface.

6. The apparatus as defined by claim 5, wherein a top corner of said affecting surface is chamfered.

7. The apparatus as defined by claim 5, wherein said relative movement between said intermediate female-spline member and said second male-spline member is in a range of 0.08 mm –1 mm.

8. The apparatus as defined by claim 1, wherein at least four protrusions are formed for each of said first male-spline member, said second male-spline member, said driving-side inner surface and said driven side inner surface of said intermediate female-spline member.

9. An apparatus for forming an image on a recording medium, which has a process cartridge detachably mounted thereto, said process cartridge including at least one element-device, such as a photoreceptor device, an exposure device, a developing device, a charging device and a cleaning device, said apparatus comprising:
a driving source to generate a rotational-driving force, which is transmitted to at least said process cartridge when said process cartridge is mounted on said apparatus; and
a spline joint section to transmit said rotational-driving force from said driving source to said process cartridge when said process cartridge is mounted on said apparatus;
wherein said spline joint section comprises:
a first male-spline member, which is fitted on a driving axis of said driving source, and an outer surface of which is splined into a plurality of first protrusions;
a second female-spline member, which is fitted on a driven axis of said process cartridge, and an inner surface of which is splined into a plurality of second protrusions; and
an intermediate spline member, an inner surface of which is splined into a plurality of third protrusions while an outer surface of which is splined into a plurality of fourth protrusions;
wherein said first protrusions are loosely engaged with said third protrusions with play therebetween and said second protrusions are loosely engaged with said fourth protrusions with play therebetween;
wherein either said first male-spline member or said second female-spline member is disengaged from said intermediate spline member only by drawing either said first male-spline member or said second female-spline member in a direction of either said driving axis or said driven axis when said process cartridge is dismounted from said apparatus; and
wherein each of said first and third protrusions has an affecting surface whose direction coincides with a radial line of each of said first male-spline member and intermediate spline member, and when transmitting said rotational-driving force from said first male-spline member to said intermediate spline member, affecting surfaces of said first protrusions press-contact affecting surfaces of said third protrusions, so that a component force of said rotational-driving force is not generated in a direction other than that orthogonal to said affecting surface.

10. The apparatus as defined by claim 9, wherein said first male-spline member and said second female-spline member are detachably and loosely engaged with said intermediate spline member such that there is relative movement therebetween, so as to constitute a universal joint, which can transmit said rotational-driving force from said driving source to said process cartridge even if said driving axis does not coincide with said driven axis within a certain range.

11. The apparatus as defined by claim 10, wherein said intermediate spline member is coupled to either said driving axis or said driven axis such that there is relative movement therebetween, so that said intermediate female-spline member does not dropout from either said driving axis or said driven axis when said process cartridge is removed from said apparatus.

12. The apparatus as defined by claim 9, wherein a top corner of said affecting surface is chamfered.

13. The apparatus as defined by claim 9, wherein said relative movement between said first male-spline member and said intermediate spline member is in a range of 0.08 mm –1 mm.

14. The apparatus as defined by claim 9, wherein each of said second and fourth protrusions has an affecting surface whose direction coincides with a radial line of each of said second female-spline member and intermediate spline member, and when transmitting said rotational-driving force from said intermediate spline member to said second female-spline member, affecting surfaces of said fourth protrusions press-contact affecting surfaces of said second protrusions, so that a component force of said rotational driving force is not generated in a direction other than that orthogonal to said affecting surface.

15. The apparatus as defined by claim 14, wherein a top corner of said affecting surface is chamfered.

16. The apparatus as defined by claim 14, wherein said relative movement between said intermediate spline member and said second female-spline member is in a range of 0.08 mm–1 mm.

17. The apparatus as defined by claim 9, wherein at least four protrusions are formed for each of said first male-spline member, said second female-spline member, said inner surface and said outer surface of said intermediate spline member.

18. A spline joint mechanism for transmitting a rotational-driving force, generated by a driving source provided in a main apparatus, to an objective unit detachably mounted to said main apparatus, said spline joint mechanism comprising:
a first male-spline member, which is fitted on a driving axis of said driving source, and an outer surface of which is splined into a plurality of first protrusions;
a second male-spline member, which is fitted on a driven axis of said objective unit, and an outer surface of which is splined into a plurality of second protrusions; and
an intermediate female-spline member, a driving-side inner surface of which is splined into a plurality of third protrusions while a driven-side inner surface of which is splined into a plurality of fourth protrusions, so that said first protrusions of said first male-spline member are engaged with said third protrusions while said second-protrusions of said second male-spline member are engaged with said fourth protrusions;

wherein each of said first and third protrusions has an affecting surface whose direction coincides with a radial line or each of said first male-spline member and intermediate female-spline member, and when transmitting said rotational-driving force from said first male-spline member to said intermediate female-spline member, affecting surfaces of said first protrusions press-contact affecting surfaces of said third protrusions, so that a component force of said rotational driving force is not generated in a direction other than that orthogonal to said affecting surface.

19. The spline joint mechanism as defined by claim 18, wherein said intermediate female-spline member is coupled to either said driving axis or said driven axis with relative movement therebetween, so that said intermediate female-spline member does not dropout from either said driving axis or said driven axis when said cojective unit is removed from said main apparatus.

20. The spline joint mechanism as defined by claim 18, wherein a top corner of said affecting surface is chamfered.

21. The spline joint mechanism as defined by claim 18, wherein relative movement between said first male-spline member and said intermediate female-spline member is in a range of 0.08 mm–1 mm.

22. The spline joint mechanism of claim 18, wherein each of said second and fourth protrusions has an affecting surface whose direction coincides with a radial line of each of said second male-spline member and intermediate female-spline member, and when transmitting said rotational-driving force from said intermediate female-spline member to said second male-spline member, affecting surfaces of said fourth protrusions press-contact affecting surfaces of said second protrusions, so that a component force of said rotational-driving force is not generated in a direction other than that orthogonal to said affecting surface.

23. The spline joint mechanism as defined by claim 22, wherein a top corner of said affecting surface is chamfered.

24. The spline joint mechanism as defined by claim 22, wherein relative movement between said intermediate female-spline member and said second male-spline member is in a range of 0.08 mm–1 mm.

25. The spline joint mechanism as defined by claim 18, wherein at least four protrusions are formed for each of said first male-spline member, said second male-spline member, said driving-side inner surface and said driven side inner surface of said intermediate female-spline member.

26. A spline joint mechanism for transmitting a rotational-driving force, generated by a driving source provided in a main apparatus, to an objective unit detachably mounted to said main apparatus, said spline joint mechanism comprising:

a first male-spline member, which is fitted on a driving axis of said driving source, and an outer surface of which is splined into a plurality of first protrusions;

a second female-spline member, which is fitted on a driven axis of said objective unit, and an inner surface of which is splined into a plurality of second protrusions; and an intermediate spline member, an inner surface of which is splined into a plurality of third protrusions while an outer surface of which is splined into a plurality of fourth protrusions, so that said first protrusions of said first male-spline member are engaged with said third protrusions while said second protrusions of said second female-spline member are engaged with said fourth protrusions;

wherein each of said first and third protrusions has an affecting surface whose direction coincides with a radial line of each of said first male-spline member and intermediate spline member, and when transmitting said rotational-driving force from said first male-spline member to said intermediate spline member, affecting surfaces of said first protrusions press-contact affecting surfaces of said third protrusions, so that a component force of said rotational-driving force is not generated in a direction other than that orthogonal to said affecting surface.

27. The spline joint mechanism as defined by claim 26, wherein said intermediate spline member is coupled to either said driving axis or said driven axis with relative movement therebetween, so that said intermediate female-spline member does not dropout from either said driving axis or said driven axis when said objective unit is removed from said main apparatus.

28. The spline joint mechanism as defined by claim 26, wherein a top corner of said affecting surface is chamfered.

29. The spline joint mechanism as defined by claim 26, wherein relative movement between said first male-spline member and said intermediate spline member is in a range of 0.08 mm–1 mm.

30. The spline joint mechanism as defined by claim 26, wherein each of said second and fourth protrusions has an affecting surface whose direction coincides with a radial line of each of said second female-spline member and intermediate spline member, and when transmitting said rotational-driving force from said intermediate spline member to said second female-spline member, affecting surfaces of said fourth protrusions press-contact affecting surfaces of said second protrusions, so that a component force of said rotational driving force is not generated in a direction other than that orthogonal to said affecting surface.

31. The spline joint mechanism as defined by claim 30, wherein a top corner of said affecting surface is chamfered.

32. The spline joint mechanism as defined by claim 30, wherein relative movement between said intermediate spline member and said second female-spline member is in a range of 0.08 mm–1 mm.

33. The spline joint mechanism as defined by claim 26, wherein at least four protrusions are formed for each of said first male-spline member, said second female-spline member, said inner surface and said outer surface of said intermediate spline member.

34. The spline joint mechanism as defined by claim 18, wherein said first male-spline member and said second male spline-member are detachably and loosely engaged with said intermediate female-spline member with relative movement therebetween, so as to constitute a universal joint, which can transmit said rotational-driving force from said driving source to said objective unit even if said driving axis does not coincide with said driven axis within a certain range.

35. The spline joint mechanism as defined by claim 26, wherein said first male-spline member and said second male spline-member are detachably and loosely engaged with said intermediate female-spline member with relative movement therebetween, so as to constitute a universal joint, which can transmit said rotational-driving force from said driving source to said objective unit even if said driving axis does not coincide with said driven axis within a certain range.

* * * * *

UNITED STATES PATENT AND TRADEMARK OFFICE
CERTIFICATE OF CORRECTION

PATENT NO.      : 6,671,475 B2
DATED           : December 30, 2003
INVENTOR(S)     : Kazunori Katada It is certified that error appears in the above-identified patent and that said Letters Patent is hereby corrected as shown below:

<u>Title page,</u>
Item [57], ABSTRACT,
Line 8, change "internal" to -- interval --

Signed and Sealed this

Sixth Day of July, 2004

JON W. DUDAS
*Acting Director of the United States Patent and Trademark Office*